United States Patent [19]
Norsworthy et al.

[11] Patent Number: 6,144,402
[45] Date of Patent: Nov. 7, 2000

[54] INTERNET TRANSACTION ACCELERATION

[75] Inventors: John P. Norsworthy, Lucas; Jay A. Thompson, Prosper, both of Tex.

[73] Assignee: Microtune, Inc., Plano, Tex.

[21] Appl. No.: 08/889,223

[22] Filed: Jul. 8, 1997

[51] Int. Cl.$^7$ .................................................. H04N 7/111
[52] U.S. Cl. ................................. 348/13; 348/10; 348/12; 348/552; 380/212; 380/242
[58] Field of Search .................................. 348/10, 12, 13; 709/217; 345/327; 380/212, 233, 239, 242

[56] References Cited

U.S. PATENT DOCUMENTS

| | | | |
|---|---|---|---|
| 3,789,131 | 1/1974 | Harney | 380/212 |
| 4,535,355 | 8/1985 | Arn et al. | 380/212 |
| 4,567,512 | 1/1986 | Abraham | 348/7 |
| 4,862,268 | 8/1989 | Campbell et al. | 348/463 |
| 4,866,787 | 9/1989 | Olesen | 455/3 |
| 5,608,446 | 3/1997 | Carr et al. | 348/6 |
| 5,699,125 | 12/1997 | Rzeszewski et al. | 348/53 |
| 5,801,785 | 9/1998 | Crump et al. | 348/563 |
| 5,835,843 | 11/1998 | Haddad | 455/4.2 |
| 5,857,142 | 1/1999 | Lin et al. | 455/5.1 |
| 5,867,207 | 1/1974 | Chaney et al. | 348/7 |
| 5,905,865 | 5/1999 | Palmer et al. | 395/200.47 |
| 5,926,205 | 7/1999 | Krause et al. | 348/7 |
| 5,943,605 | 8/1999 | Koeple | 455/6.2 |
| 5,953,005 | 9/1999 | Liu | 345/302 |
| 6,016,172 | 1/2000 | Huh | 348/845.1 |

OTHER PUBLICATIONS (Fred Halsall; Data Coomunication, Computer Networks & Open Systems; pp. 53–55), 1996.

*Primary Examiner*—Andrew I. Faile
*Assistant Examiner*—Reuben M. Brown
*Attorney, Agent, or Firm*—Fulbright & Jaworski L.L.P.

[57] ABSTRACT

The invention is a multiple mode transmission system that interconnects the computer of a user with the Internet. The system has a first link that is a relatively low bandwidth telephone system. The system also has a second link that is a relatively high bandwidth television system. The television link can be either terrestrial or cable. The user would send an information request to the Internet across the telephone system. The actual information would be sent to the user via the television system. Scheduling data that informs the user of the time, channel, and exact location of the information in the television signal is sent to the user across the telephone system. The scheduling data is used by the inventive system to program the TV tuner that is used by the computer to receive the TV signal. The information can be encrypted, and the key would be included with the scheduling data. The channels can be dedicated data channels. A plurality of users would share the television system, and each user is only temporarily assigned a portion of the channel.

62 Claims, 2 Drawing Sheets

INTERNET TRANSACTION ACCELERATION

TECHNICAL FIELD OF THE INVENTION

This invention relates generally to global network communications, and specifically to a system and method that uses existing high bandwidth transmission systems to download information from the global network.

BACKGROUND OF THE INVENTION

The popularity of the Internet has exploded in the past few years. Each day more and more people are signing on to the Internet. This rapid expansion has resulted in the formation of a vast pool of publicly available information on a wide variety of topics. The information is not only in pictures and text, but may also be in audio or video formats. The problem is that as the amount of information increases, the more time is required to download the information from the Internet. The information increase can be because either there is more information or the information format compels larger data amounts. The time increase can also be a problem for the Internet Service Provider (ISP), as users will remain logged on for longer periods of time to download large files, thus causing the ISPs to have gridlock.

Presently, the dominant use of the Internet is as a reference tool where the Internet is being used to locate and provide some kind of information. Typically, users employ a search service or engine like Yahoo or Alta Vista or some other engine on the World Wide Web to search the Internet for relevant information. Accordingly, once relevant information is located, a request is made by the user's PC to the ISP to retrieve or download the information.

Typically, the size of the information received is much larger in terms of bytes than the information request that is delivered. The request could be basically a few commands comprising the location of the information. The information that is downloaded is typically in HTML format, which may have bit mapped images, JPEG files, MPEG files, audio clips, and the like. The procedure for downloading usually takes a long time, especially if the user is constrained to a 28.8 kilo-bits per second (Kbps) or 33.6 Kbps, or even to a 56 Kbps baud modem.

More specifically, the size of the request would be perhaps 1,000 bytes, while the requested information could be several megabytes. As a result, there is a need in the technology for a method and apparatus to receive data that is much larger than the size of the request. The ratio of receive to request may be a 1,000 to 1, depending on the information. For example, text information may have a ratio of 10 to 1 or 100 to 1, however, video clips with sound may yield a ratio of a 1000 to 1 or higher.

An existing solution that is available in the prior art is to utilize a satellite return path to the computer to provide the requested data to the user. Thus, the user sends out a request over a telephone system, and receives the data over a satellite downlink. However, this solution is expensive as it requires the purchase and installation of a satellite downlink station. Moreover, there is a limited ability to install such systems, particularly in urban environments with space limitations, and other areas with covenants preventing the installation of satellite antennas. Furthermore, the data rate achieved by this system is only about 400 Kbps which is not significantly higher than current ISDN line data rates of 128 Kbps per second.

Another existing solution is to use a broadcast television or a cable station to transmit digital data through existing television signals. This has been developed by a company called EN Technology. It appears that they are providing a limited television link that broadcasts the data to a community of users, such that while viewing data enhanced programming on TV, the user can receive digital data as well as the television signal. However, this solution lacks selectivity or interactivity, as the user can only receive whatever data the broadcaster is sending. In other words, the user cannot select the data that will be sent by broadcaster.

Therefore, there is a need in the prior art for an inexpensive solution that uses the existing broadcasting infrastructure to send data to PCs which would accelerate the downloading process, particularly where the data received is significantly larger than the size of the request, typical of the needs encountered by the Internet user.

SUMMARY OF THE INVENTION

These and other objects, features and technical advantages are achieved by a system and method that uses a normal modem to request data, and analog and/or digital broadcast television channels, either terrestrial or cable, as the return path. The inventive system would also work with digital television channels that will soon be publicly introduced.

In the inventive system, the user would request, over telephone lines via modem, for the information to be downloaded. Then the Internet Service Provider (ISP) would send a notice to the user stating the time, and location, i.e. frame, line, and segment of video, in which the information will be relayed to the user. More particularly, the notice is sent to the user's PC, and causes the configuration of the PC for receipt of the information.

The rationale for using the inventive system is that there is substantially unused broadcast bandwidth available, and the data rates that could be achieved are in the range of megabits per second. Furthermore, another useful characteristic of video is that it has a considerable amount of synchronization. Specifically, it has frame, field and line synchronization. This allows for ease of identification of the starting and stopping points for a particular user's information, and consequently, allows many users to access the same channel or set of channels since each user is keyed to only their information.

In analog television that uses the teletext standard that has been implemented in Europe, it is possible to obtain 384 bits per line of digital data. With 30 frames per second and 525 lines per frame, this translates into a data rate of approximately 6 megabits per second (Mbps). This standard uses the vertical blanking interval to insert data into the television signal. With the emerging digital television standards, two data rates are available. In the terrestrial standard, that is through the air, a data rate of approximately 19.3 Mbps per 6 megahertz (MHz) channel is available. In the cable standard, a rate of about 36 to 38 Mbps per 6 MHz channel is available for data transfer.

One way to implement the inventive system is to dedicate or reserve at least one broadcast or cable channel for data transmission. For example, there is the Weather Channel, the Home & Garden Channel, etc. The inventive system would use, for example, the Data Channel. Thus, Internet users could attach television receivers to their PC and receive the high bandwidth broadcast over the existing infrastructure. The existing infrastructure is the broadcast television industry, either cable or terrestrial. Multiple data channels could be used for increased system capacity or data security, in that a portion of the information could be sent over a first channel, and the remainder sent over a second channel. A notice from the ISP to the user via the modem would detail the number and identity of the channels used for data transfer.

Another way is to replace segments of existing channels with the transmitted data. For example, a portion of a frame and a line (or a series of frames and lines) of the Weather Channel and/or the Home & Garden Channel would be replaced with data. Another method is to use code division multiplexing, wherein the data is encoded using a pseudo random code to multiplex the data over a broadband signal path. The pseudo random code prevents correlation between the data and other signal being transmitted through the same signal path. The broadband path may include the frequencies from several adjacent TV channels, thus spreading the multiplexed data across a number of TV channels and therefore decreasing the likelihood of the TV signal degradation on any one TV channel.

One use of the inventive system is for a virtual classroom. The image and audio of a teacher or instructor, as well as any associated graphics, would be sent to students via the high bandwidth TV link. Any questions or comments submitted by the student would be delivered to the teacher via the low bandwidth modem link. The modem link could also send simple graphics and/or a "talking head" of the student.

It is a technical advantage of this invention that the system uses the existing infrastructure for transmitting information, specifically the broadcast television system. Thus, a system using new mediums such as fiber optic lines or ISDN lines does not have to be established.

Another technical advantage of this invention is that the synchronization that is inherent in video can be used for dividing up the data stream into segments for different PC users. In other words, the video signal can be efficiently partitioned for different users, depending upon the size of the requested information, as well as desired resolution, because of the frame, field and line subdivisions of the video signal, as proposed in VSB-8 standard for digital signal television.

A further technical advantage of this invention is that a community of interest could use the same feed mechanism, i.e. the same cable channel or broadcast channel. Each individual user's computer is programmed with the time sequence or reception point that the user would receive the requested data.

A further technical advantage of this invention is that the digital data could be encrypted. The data could be encrypted using standard digital encryption techniques. Each user could be assigned an ID and a key used to decrypt the data. Due to the shared nature of the transmission medium, someone would be able to intercept messages if not encrypted in some manner. The key for any one specific transmission would be delivered to the PC user via the modem telephone line and not across the data transmission medium. Thus, only the user would have the key to decrypt the downloaded data. So a hacker who intercepts the transmission would only receive encrypted data, and would not have the key for this specific data transmission. Since the key may be changed from request to request, then even though the hacker has a key to a previous transmission for the same user, the hacker would not be able to decrypt the current transmission.

A further technical advantage of this invention is that the inventive system is portable, in that a notebook computer coupled to a modem and a tuner could receive broadcast television signals from any location that receives the broadcast signal. An immediate connection with the telephone system is not necessary, as the television station could be pre-programmed to broadcast the information and the notebook computer could be pre-programmed to download the information. However, a connection with the phone system, e.g., pay telephone or mobile phone, is advantageous, as it allows for interactive information requests to be immediately satisfied.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
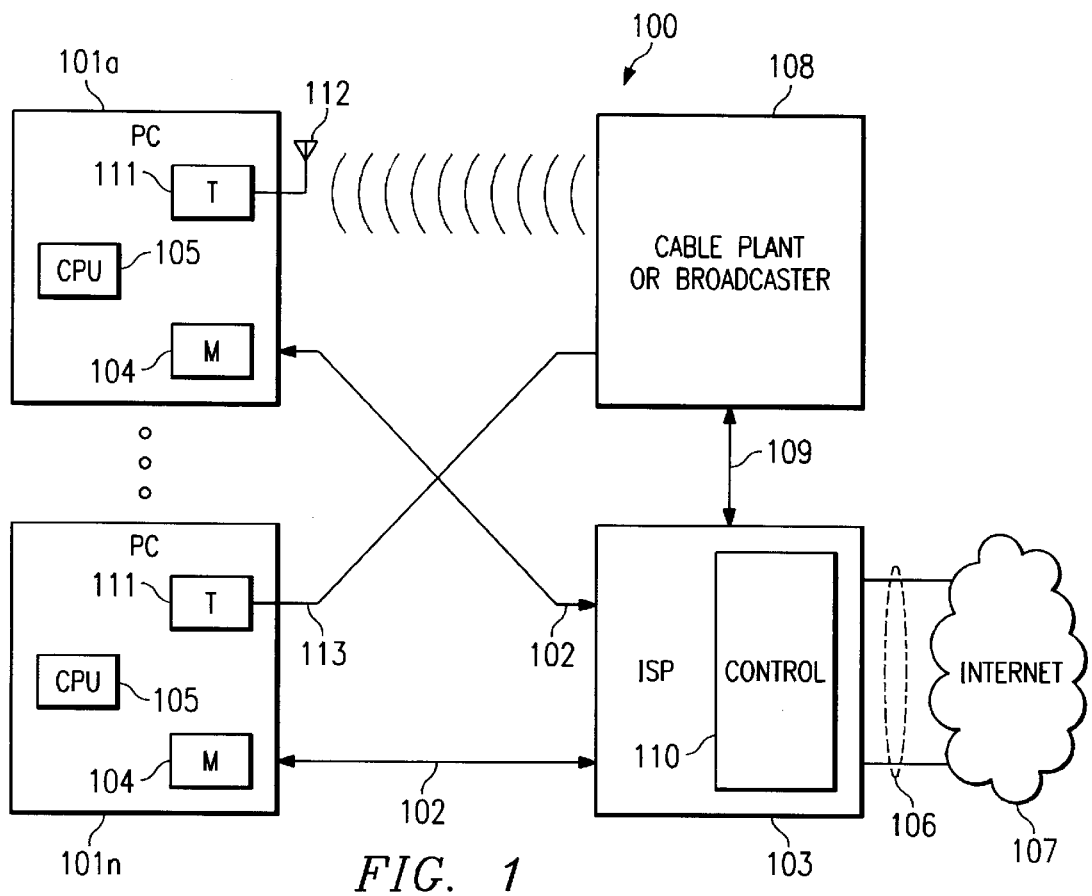
FIG. 1 depicts the inventive Internet transaction acceleration system.

FIG. 1 depicts the inventive system 100 in which several personal computers (PCs) 101a through 101n, are each connected through the typical switch telephone network 102 to an Internet Service Provider (ISP) 103. This is a typical configuration where a PC 101a communicates with the ISP 103 using modem 104. The modem 104 is a standard modem rated at 14.4 Kbps to 56 Kbps, or even higher. The network 102 could be an ISDN line, a telephone system (POTS) line, asymmetric digital subscriber line (ADSL), microwave link, or any other telecommunication service.

The user, via CPU 105, would send an instruction through the modem 104 to the ISP 103 to search for a particular piece of information or data using one of the various known search engines. The ISP 103 would then route the information, according to the request command, from the Internet 107 or other source, via the high bandwidth lines 106. Without the inventive system, this information would be retrieved and then re-communicated via ISP 103 over the telecommunication link 102 to PC 101a, and thus may take a substantially longer time to transmit the information, particularly if it includes video information. Notice that the information would be larger than the command that was transmitted to initiate the search.

The wait for this information suffered by the user is frustrating, particularly when several iterations are required before the complete information is received. Thus, the ease and usefulness of the Internet is limited by the time and patience of the user to wait for the information to arrive. Moreover, valuable resources of the ISP are tied-up both from having the user logged on longer than necessary, and from allocating resources to hold the information until downloading is completed.

However, with this invention, the information at ISP 103 may be transmitted back to PC 101*a* through the community TV communication service, which could be either cable or broadcast service at head end 108. The cable plant or broadcaster 108 receives the information from the ISP 103 and then designates a channel from the typical channels that are available in the community, either cable or broadcast. The cable plant 108 then communicates scheduling information regarding the designated channel back to the ISP 103 over the high bandwidth link 109. ISP 103 then, in turn, communicates the scheduling information, including the designated channel and time slot of when the scheduled information will be available, to the PC 101*a* across the telephone lines 102 and modem 104. A preferred embodiment is where the ISP and the cable plant are located close together, perhaps being the same entity or in the same physical building. However, this is not required as the ISP and the cable plant can be connected via a high bandwidth link, such as multiple T-1 connections or a T-3 connection.

At the proper time, cable plant 108 then places the information on the cable 113 or broadcasts the information on the designated channel and during the time slot or series of time slots that were pre-identified to the user. The computer 101*a* of the user then receives this information via a television tuner 111. The tuner 111 is the same tuner that would be used by the PC to receive any standard television broadcast. This tuner could, for example, be constructed on a single substrate as set forth in commonly assigned co-pending application, Ser. No. 08/426,080, entitled "Monolithic Television Tuner", filed Apr. 21, 1995, which is hereby incorporated by reference. Use of a single substrate tuner would be the preferred embodiment in situations where multiple tuners are required. The tuner has an antenna 112 for receiving broadcast signal, and/or a cable hook up 113 for connection to the cable system. The information is then processed by CPU 105 for presentation to the user on the screen of PC 101*a*. Note that the separation of control channel data from the information data stream allows more data to be passed over the TV as the amount of header bits required for the information sent over the TV has been reduced or eliminated.

The inventive system is economical because the infrastructure for its operation already exists in that the cable plant 108 has a cable system already in place that is connected to most homes or offices. PCs typically now have TV tuners installed to receive TV signals from either cable or broadcast stations and are able to convert these signals through video processing circuitry. Therefore, no additional components need to be installed into the PC, other than some processing software for controlling the CPU 105. As the television technology evolves into the digital format, the video signal, which is in fact a digital bit stream, can be regarded as a compressed video signal or high bandwidth information delivery signal. The bit stream is an ideal delivery mode for high bandwidth Internet information transactions.

In situations where it is desirable to have data security, the data can be encrypted by ISP 103 or by cable plant 108. Please note that a level of security already exists because the identity of the user or recipient of the message is not present in the data broadcast over the public medium. A key is issued as a part of a user's subscription to the inventive service. The key would be used to encrypt data that is uniquely intended for receipt by the user. The encryption would be done via standard encryption techniques that are well-known throughout the industry. The key can be changed at each transmission session or for each packet that is transmitted at any one time, or the key may be used for a specific time period, e.g., one year. The key may be generated solely by the ISP, or may be formed by merging a partial key from the ISP 103 and a partial key from the PC 101*a*, forming a unique key for the user of PC 101*a*. There may be more than one user of a PC 101*a*, and each different user could have a unique key. This security feature would enhance any existing security or data encryption, as well as the general anonymity provided by the invention.

Another form of data security would naturally result from having the information delivered to the user on multiple channels. The channels could be multiple dedicated data channels or channels already in use (i.e. ABC, NBC, CBS, etc.). The information would be spread among different channels so it would be more difficult for hackers to intercept sensitive data, either in the clear or encrypted format. If the PC has only a single tuner, each packet of data will be transmitted sequentially, one channel at a time, with the tuner channel hopping according to a predetermined pattern. Thus, a hacker will need to know the specific time, frame, field, and line of the information transmission, as well as the channel hopping pattern to intercept the entire information. Only the user and the ISP would have this information, because this scheduling data would be sent to the user over the telephone network, which is not publicly available. As the cost of tuners decreases allowing multiple tuners in PCs, or as the level technology increases allowing a single tuner to receive data across several channels simultaneously, then it will be possible to receive parallel transmissions of data which will increase the data security effects discussed above.

The control unit 110 in ISP 103 serves several functions, one of which is to determine if a particular user is going to receive the information over the high bandwidth path 109 or over the normal telephone line 102. Some types of information, particularly that which is small in amount, do not require the use of the cable plant 108. Accordingly, that information would be sent to the PC over the telephone lines 102. Software located at the ISP would make the decision as to whether or not to transfer the information via the modem or the cable plant. It is also possible that the data could come back over both paths, since these are concurrent paths to the user. Certain parts of the data that do not require high bandwidth could come back over the lines 102 and certain data could come back over the high bandwidth line 109 under control of control circuitry in system 110.

The system would operate as follows. Suppose the user desires to receive information on the different hotels in Paris. The user would make that request via the modem 104 to the ISP 103 (for example, America Online). After the information is located, the ISP 103 would then dispatch the delivery or scheduling information to the user via modem 104 and telephone line 102. The scheduling information would detail the frame, field, and line, as well as the particular channel and date to tune to for receipt of the requested information. The actual time for delivery would be indicated by the frame number and line number, as a certain number of frames would be sent out each time period, such as a day. Each frame is given a unique number that is tracked by a software counter or register in the PC. This particular slot would be unique to the information requested by the user and will be a very small subset of the overall bandwidth distributed by the cable plant or broadcaster 108. The actual time for delivery is indicated by the frame and line number, as a certain number of frames would be sent out per each day (or other time period). Each frame is given a unique number that is tracked by the PC via a software counter or hardware register.

The slot assignment is one way to control who uses the service, as it will always be initiated by an ISP, who knows which users are authorized to use this service. Natural data security is available by the simple fact that there is such a large bandwidth being transmitted and that a particular user is allotted such a small amount of that bandwidth. A user does not have a dedicated channel, but rather is assigned a piece of a channel, one instance at a time. For each transaction or each data packet of that transaction, the ISP informs the receiving PC via the modem, as to the channel, frame, field and line, to be dedicated to this specific transaction. The next time a user requests information or other transaction, a completely different frame, field and time or channel may be assigned.

Figure 2:
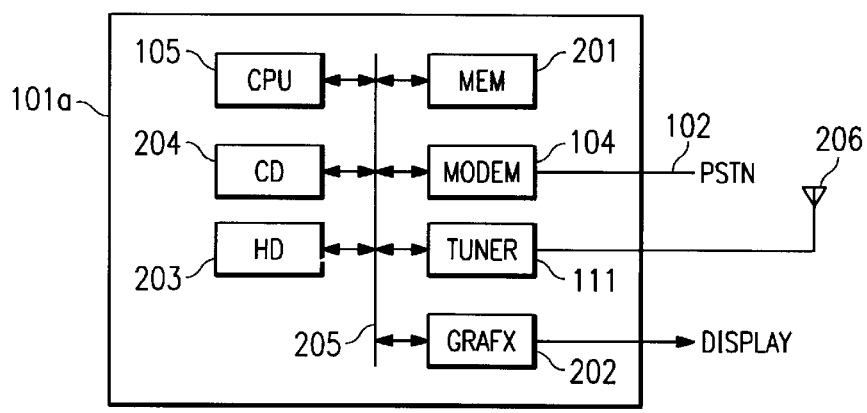
FIG. 2 depicts a simplified diagram of a personal computer.

FIG. 2 depicts a PC 101a in a simplified, block diagram form. The invention requires the PC to have only one additional component, which is the television tuner 111. Some PCs come equipped with a tuner, however, for those that do not, the tuner would have to be installed. Moreover, the television tuner is part of the now emerging convergence products. These products are combinations of televisions and PCs, having characteristics of both TVs and PCs. Nonetheless, the tuner is a fairly inexpensive add-in, usually less than $100.

The tuner sends digitized base band information to the CPU 105 for decoding the information to be useable by the PC. A uniqueness of this product is that much of the operational burden is handled by the central processing unit (CPU) 105 of the PC 101a. FIG. 2 depicts the simplified architecture having a CPU 105 with a bus structure 205 that typically is a combination of the PCI and ISA busses. The bus structure 205 interconnects the basic components of the PC, which are the CPU 105, memory 201, modem 104, tuner 111, graphics processor 202, hard drive 203, and CD-ROM 204. PCs have other components as well, but this is an illustration of a simplified structure.

The operation of the PC 101a in the invention is as follows. The modem 104, under the control of CPU 105, would send and receive data to the ISP 103, as per FIG. 1, and then the PC would store the scheduling data, which is the specific time, frame, field, channel and line data, for receiving the information via tuner 111 and antenna/cable hookup 206. Once the PC receives the information and the information is decoded by the CPU 105, the information would be displayed for the user by the graphic subsystem 202.

An advantage of using television, either cable or broadcast, is that synchronization is inherent in video, both digital and analog, and can be used for dividing up the data stream into segments for different users. This allows flexibility so that the time slots can be efficiently partitioned for different users, depending upon the size of their requested information, because of the frame, field and line subdivisions of the video signal. The line of video will contain 384 bits of data in a standard teletext scheme, although it could be much higher in digital television. In analog television there are 30 frames per second with 525 lines per frame, yielding 6 Mbps. High definition or digital television would allow a faster data rate, and the new digital TVs would have an even higher data rate.

The existence of lines, fields and frames allow the time slots to be naturally and efficiently segmented into chunks that can be used for unique transactions. An important requirement for the delivery of high quality multimedia data, such as full motion video and audio, is the establishment of a dedicated and guaranteed channel bandwidth between the ISP and the user. The channel data rates of approximately 19 Mbps for terrestrial and approximately 36 Mbps for cable, per 6 MHz channel, can be segmented into smaller subchannels. For example, the 36 Mbps cable channel can be segmented into approximately 150 256 Kbps subchannels. The segmentation can be personalized, so that a user can request a larger subchannel when needed. For example, 64 Kbps is the minimum rate for video conferencing, while 256 Kbps would provide a better quality picture. Consequently, the user can request and pay for a guaranteed higher data rate to achieve a better quality or higher resolution picture. The segmentation can be accomplished by time division multiplexing of the base band data signals in the data channel. By employing this feature of the invention, the user receives a guaranteed bit rate and their desired quality of service.

Another feature of the invention is that the scheduling data sent by the ISP to the user can also establish a setup so that the PC can automatically receive the information at different times. For example, the information can be transmitted from the central broadcast service late at night or some other alternate time. Moreover, the PC can be programmed so that the reception of data occurs on a periodic basis, such as weekly downloads of technical updates. Also, downloading can occur from the result of certain events, wherein the ISP would communicate over the modem to inform the computer to look on a channel at a certain time to download information that would be of interest. These could be any number of different types of media or events or news or stock quotations that are available at particular times.

Another feature is that the system could be used to broadcast data to multiple users, which known as "multicasting." For example, there are many users who are subscribers to the interactive *The Wall Street Journal* ("Journal"). Therefore, at a specific time the current Journal would be broadcast on the same channel to multiple users. All users would receive the Journal at the same time, by tuning into the specific channel at a particular time of day. This could work with either the same channel which could be assigned everyday at the same time, or the local ISP would tell each user's PC, for that particular day, which channel and what sequence to be tuned in for downloading.

Figure 3:
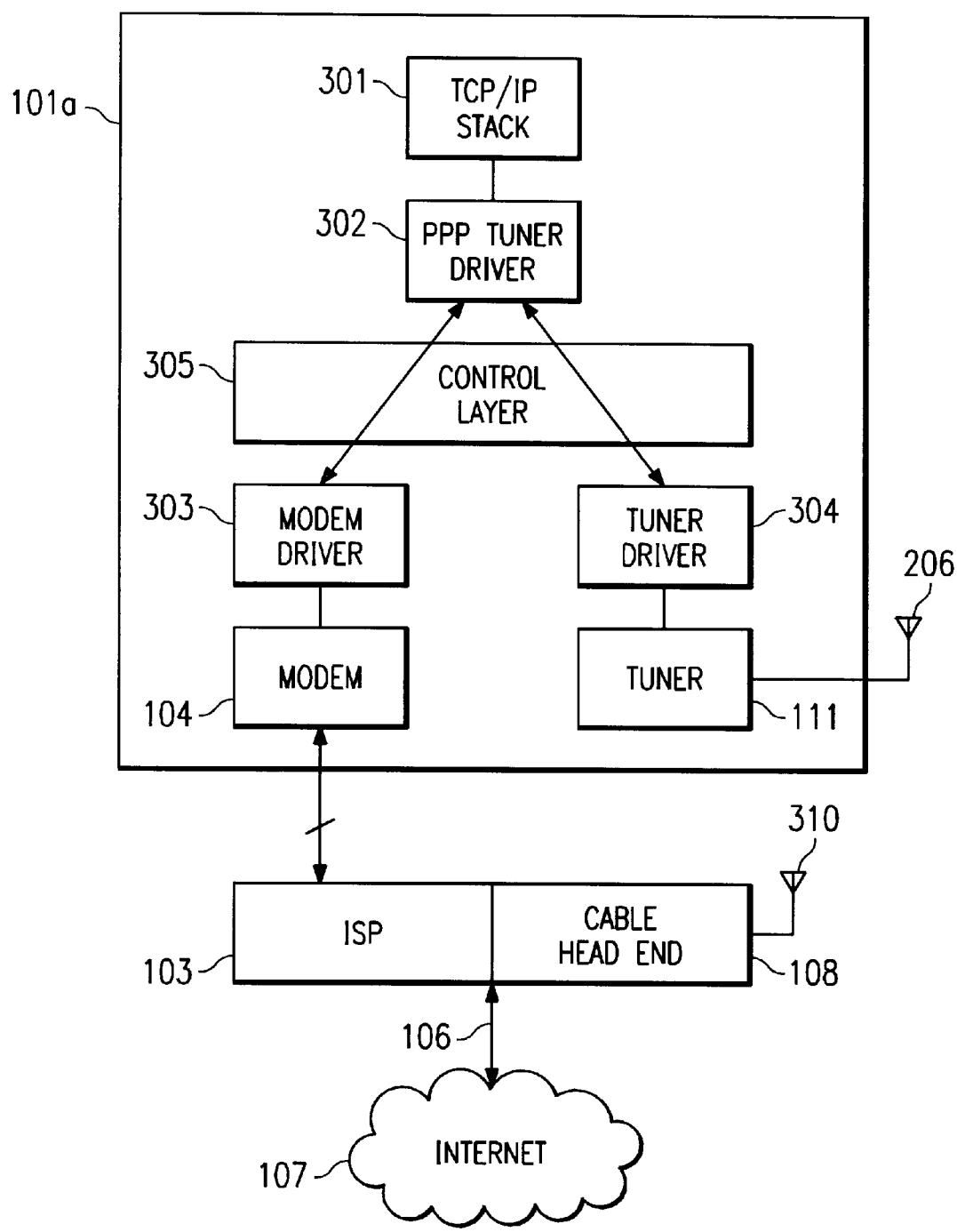
FIG. 3 depicts the interaction of the personal computer, Internet service provider, and television service using the inventive system.

FIG. 3 depicts the interaction of the PC, the ISP, and the television service, using the inventive system. FIG. 3 includes a normal TCP/IP stack 301 which would be native to the system. A driver 302, which is formed by modifying a point to point protocol (PPP) driver, would be cognizant of the information or data coming from the tuner 111. The driver 302 would multiplex the incoming data, as well as queue up the requested information to go out over the modem 104, which is typically Internet requests and responses. The requests will go through the modem 104 to the ISP 103, over the Internet 107.

The information would be retrieved from the Internet, and if it is a large piece of data, it would be given a time slot to be transmitted over the cable head end 108. The scheduling data for the information would be sent from ISP 103 back to modem 104. The driver 302, after receiving the scheduling data, would program the tuner driver 304 as to when to expect the information. The information would then be transmitted via either cable or broadcast 108 and received by the tuner 111. The information is then sent up into the stack 301 to be held until interpretation. The tuner driver 302 also has the ability to request a retransmission if the information is missed or not received. However, the TCP/IP stack 301 would automatically ask for retries if the information is not received.

FIG. 3 depicts various software drivers, including the modem driver 303, which controls the modem 104, and the tuner driver 304, which controls the tuner 111. The PPP tuner driver 302, is modified to be able to support the multiplexing of the different data streams. Note, that the PPP driver 302 does not realize that data will be coming from two places, specifically, the tuner 111 and the modem 104. A software control layer 305 is placed between the PPP tuner driver 302, and the modem 104 and tuner 111, and merges the data together. Thus, the control layer 305 would make the modem 104 and tuner 111 combination look like a single network device to the PPP driver 302.

The control layer 305 has several functions. The layer buffers the information coining from the PPP driver 302 for transmission to the modem 104 and the tuner 111. The layer 305 also buffers incoming tuner data or scheduling information from the modem 104. The layer 305 creates commands or controls for the modem driver 303 and the tuner driver 304 from the buffered information. The layer combines and presents data to the PPP driver 302 from the modem 104 and the tuner 111.

In operation, the layer 305 receives and buffers an information request from the PPP driver 302. The layer 305 then creates commands to program the modem 104 to send out the request. The scheduling data is then sent through the modem 104, and is buffered in the control layer 305. The scheduling data comprises channel, time, frame, line, and segment data for receiving the information from the tuner 111. The scheduling data is then sent to the PPP driver 302. Note that there will be a time lag between when receiving the scheduling data, and when the actual requested information is downloaded from the tuner 111. The time lag allows the PPP driver 302 to issue commands to program the tuner 111, which are buffered in the control layer 305. After the tuner 111 receives the information, it is passed to the control layer 305, where the information is buffered. The information may be in a raw form and require decoding by the CPU. The control layer 305 will control the decoding. Once the data has been decoded, then it is presented to the PPP driver 302 which treats it as any normal type of data that is received from the Internet.

The control layer 305 also configures the system for information delivery. Specifically, whether to transfer the information via the modem 104 or the cable plant 108. All, some, or none of the information may be transferred via cable plant 108. Also, none, some or all of the information may be transferred via the modem 104. The ISP 103 would make the decision as to how the information will be sent and would include the decision with the scheduling data. The control layer 305 would then appropriately configure the PC to receive the information either by modem, tuner, or both. The decision would be based upon the size of the information being delivered and delivery resource availability, i.e. the condition of the telephone lines and cable lines. Thus, if the information is large or the telephone line is troubled, then the cable plant 108 will be used for information delivery. Thus, the control layer 305 that is resident at the ISP makes the decision as to which path the return data is going to come back to the PC, and it is the control layer that is resident in the PC that configures the PC.

Although the present invention and its advantages have been described in detail, it should be understood that various changes, substitutions and alterations can be made herein without departing from the spirit and scope of the invention as defined by the appended claims.

What is claimed is:

1. A multi-transmission mode system interconnecting a computer of a user and a network, the system comprising:
   first means, having a relatively low bandwidth, for sending requests for information from the user to the network, and for sending data that details aspects of delivery of the information to the user, wherein said data comprises a channel designation, a time designation, a frame designation, a field designation, and a line designation; and
   second means, having a relatively high bandwidth, for delivering the information to the computer of the user, wherein the identity of the user is not present in the information delivered by said second means.

2. The system of claim 1, wherein the first means is a telephone system, the second means is a television system, and the network is an open global network, the system further comprises:
   a television tuner located at a site of the user that connects the computer to the television system; and
   a modem located at the site of the user that connects the computer to the telephone system.

3. The system of claim 2, wherein:
   a plurality of users share the television system; and
   each user is temporarily assigned a portion of the television system to receive their respective information.

4. The system of claim 4, wherein the data further comprises a date designation.

5. The system of claim 4, wherein the data comprises a plurality of channel designations, a plurality of time designations, a plurality of frame designations, a plurality of field designations, and a plurality of line designations.

6. The system of claim 4, wherein the data comprises a plurality of channel designations, a single time designation, a plurality of frame designations, a plurality of field designations, and a plurality of line designations.

7. The system of claim 2, wherein:
   the information is separated into a plurality of portions; and
   a plurality of channels of the television system are used to send the information portions.

8. The system of claim 7, wherein:
   the computer has a single tuner;
   each portion is sent over a different channel of the plurality of channels in a sequential manner; and
   the tuner is sequentially set to each corresponding channel and receives the portion sent on the corresponding channel.

9. The system of claim 7, wherein:
   the computer has a plurality of tuners;
   each portion is sent over a different channel of the plurality of channels in a simultaneous manner; and
   each tuner is correspondingly set to each channel of the plurality of channels, and receives a corresponding portion of the information.

10. The system of claim 2, further comprising:
    a third means for controlling the modem and the tuner.

11. The system of claim 10, wherein:
    the third means receives the data from the modem and programs the tuner to receive the information.

12. The system of claim 10, wherein:
    the third means receives the information from the tuner and controls decoding of the information into useable form.

13. The system of claim 2, wherein:
the television system is a cable system; and
the tuner has a cable hook up.
14. The system of claim 2, wherein:
the television system is a broadcast system; and
the tuner has an antenna.
15. The system of claim 2, wherein:
the tuner receives the information from the television system.
16. The system of claim 2, further comprising:
a service provider, for providing the user with access to the network, that is connected to the computer of the user via the telephone system, and is connected to the network and to the television system via relatively high bandwidth links.
17. The system of claim 16, wherein the service provider comprises:
means for determining a size of the information; and
means for deciding which link to send the information based upon the size of information;
wherein a relatively small sized information is sent to the user over the telephone system link; and
a relatively large sized information is sent to the user over the television system link.
18. The system of claim 16, wherein the service provider comprises:
means for encrypting the information before sending the information to the user over the television system link;
wherein a key for the encrypted information is sent to the user over the telephone system link.
19. The system of claim 18, wherein:
the data includes the key.
20. The system of claim 18, wherein:
the key is changed for each different information requested by the user.
21. The system of claim 18, wherein:
the key is changed for each portion of the information that is sent to the user.
22. The system of claim 18, wherein:
the key is assigned to the user for a predetermined time period.
23. The system of claim 1, wherein:
the network is an open global network.
24. The system of claim 1, wherein:
the network is the Internet.
25. The system of claim 1, wherein:
the first means is a bi-directional link.
26. The system of claim 1, wherein:
the first means is a substantially private link.
27. The system of claim 1, wherein:
the first means is a telephone system.
28. The system of claim 1, wherein:
the second means is a uni-directional link.
29. The system of claim 1, wherein:
the second means is a substantially public link.
30. The system of claim 1, wherein:
the second means is a television system.
31. The system of claim 30, wherein:
the television system is a cable television system.
32. The system of claim 30, wherein:
the television system is a broadcast television system.
33. The system of claim 30, wherein:
the television system has a dedicated data channel to deliver the information.
34. The system of claim 30, wherein:
the second means is a portion of a channel in the television system to deliver the information, wherein the remaining portion of the channel carries a signal unrelated to the information.
35. The system of claim 34, wherein:
the signal is a television show.
36. The system of claim 34, wherein:
the signal is information for a different user.
37. The system of claim 1, wherein:
the information is sent to multiple users.
38. The system of claim 37, wherein:
the multiple users receive the information simultaneously.
39. The system of claim 1, wherein:
the information is sent relatively contemporaneous with the request.
40. The system of claim 1, wherein:
the information is sent to the user on a period basis.
41. The system of claim 1, wherein:
the information is sent substantially non-contemporaneous with the request.
42. The system of claim 41, wherein:
a time for delivery is selectable by the user.
43. A multi-transmission mode system interconnecting a computer of a user and a network, the system comprising:
a first link having a relatively low bandwidth;
a second link having a relatively high bandwidth;
wherein a request for information is sent from the user to the network via the first link, the information is delivered to the computer of the user via the second link, data detailing aspects of delivery of the information is sent to the user via the first link, and wherein the identity of the user is not present in the information delivered via said second link and wherein said data comprises a channel designation, a time designation, a frame designation, a field designation, and a line designation.
44. The system of claim 43, wherein the first link is a telephone system, the second link is a television system, and the network is the Internet network, the system further comprises:
a television tuner located at a site of the user that connects the computer to the television system; and
a modem located at the site of the user that connects the computer to the telephone system
wherein the tuner receives the information from the television system.
45. The system of claim 44, wherein:
a plurality of users share the television system; and
each user is temporarily assigned a portion of the television system to receive their respective information.
46. The system of claim 44, wherein:
the television system is a cable system; and
the tuner has a cable hook up.
47. The system of claim 45, wherein:
the television system is a broadcast system; and
the tuner has an antenna.
48. The system of claim 44, further comprising:
means for controlling the modem and the tuner.

49. The system of claim 48, wherein:

the means for controlling receives the data from the modem and programs the tuner to receive the information.

50. The system of claim 48, wherein:

the means for controlling receives the information from the tuner and controls decoding of the information into useable form.

51. A multi-transmission mode system interconnecting a computer of a user and the Internet network, the system comprising:

a telephone system for sending requests for information from the user to the network, and for sending data that details aspects of delivery of the information to the user, wherein said data comprises a channel designation, a time designation, a frame designation, a field designation, and a line designation;

a television system for delivering the information to the computer of the user, wherein the identity of the user is not present in the information broadcast by said television system;

a service provider, for providing the user with access to the network, that is connected to the computer of the user via the telephone system, and is connected to the network and to the television system;

a television tuner located at a site of the user that connects the computer to the television system, and receives the information from the television system;

a modem located at the site of the user that connects the computer to the telephone system for sending the requests and receiving the data; and means for controlling the modem and the tuner;

wherein the means for controlling receives the data from the modem and programs the tuner to receive the information.

52. The system of claim 51, wherein:

the television system has a dedicated data channel to deliver the information.

53. The system of claim 52, wherein:

a plurality of users shares the data channel; and each user is temporarily assigned a portion of the data channel to receive their respective information.

54. The system of claim 51, wherein:

the means for controlling receives the information from the tuner and controls decoding of the information into useable form.

55. The system of claim 51, wherein:

the television system is a cable system; and the tuner has a cable hook up.

56. The system of claim 51, wherein:

the television system is a broadcast system; and the tuner has an antenna.

57. A method for retrieving information from the Internet network onto a computer of a user, the method comprising the steps of:

sending requests for information from the user to the network via a telephone system;

sending data that details aspects of delivery of the information to the user via the telephone system, wherein said data comprises a channel designation, a time designation, a frame designation, a field designation, and a line designation; and delivering the information to the computer of the user via a television system, wherein the identity of the user is not present in the information delivered via said television system.

58. The method of claim 57, further comprising the step of:

decoding of the information into a form useable by the computer.

59. The method of claim 57, further comprising the steps of:

using a channel of the television system to deliver the information; and setting a tuner to the channel to receive the information, based upon the data.

60. The method of claim 59, wherein the television system is a cable system, and the method further comprises the step of:

connecting the tuner to the television system through a cable hookup.

61. The method of claim 59, wherein the television system is a broadcast system, and the method further comprises the step of:

connecting the tuner to the television system through an antenna.

62. The method of claim 59, wherein a plurality of users share the channel, and the method further comprises the step of:

assigning, temporarily, a portion of the television channel to each of the plurality of user, for each user to receive their respective information.

* * * * *